Dec. 1, 1970 P. R. GLEY 3,543,603
AUTOMATIC QUICK RELEASE MECHANISM
Filed Jan. 10, 1968 3 Sheets-Sheet 2
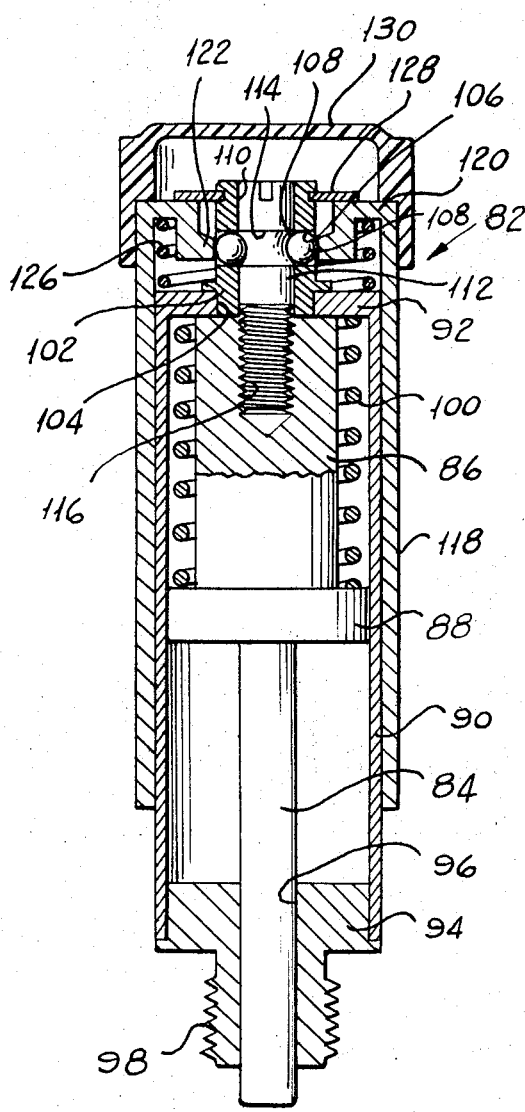
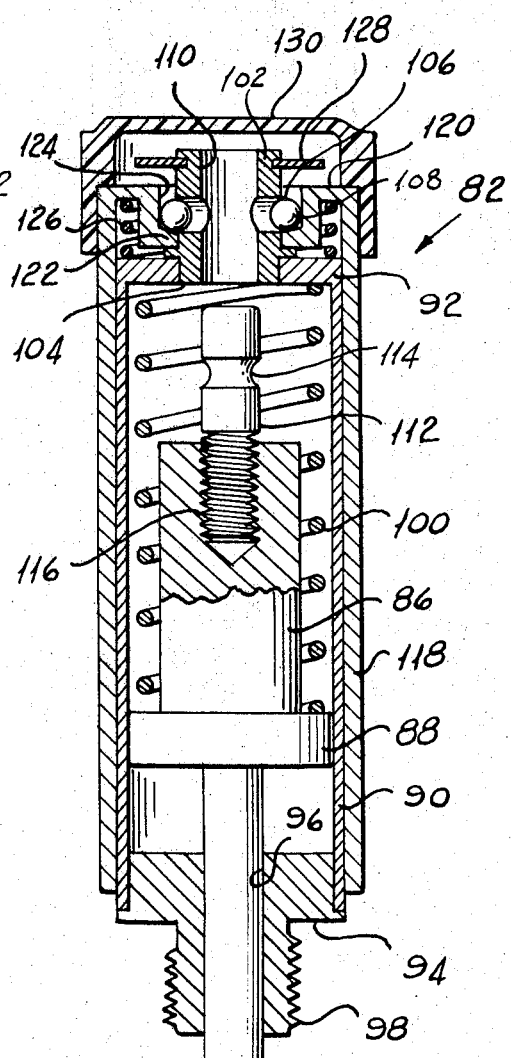
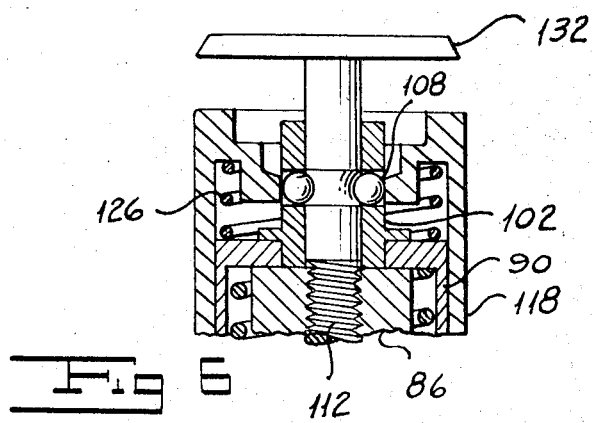
INVENTOR.
Paul R. Gley
BY
Shenier & O'Connor
ATTORNEYS

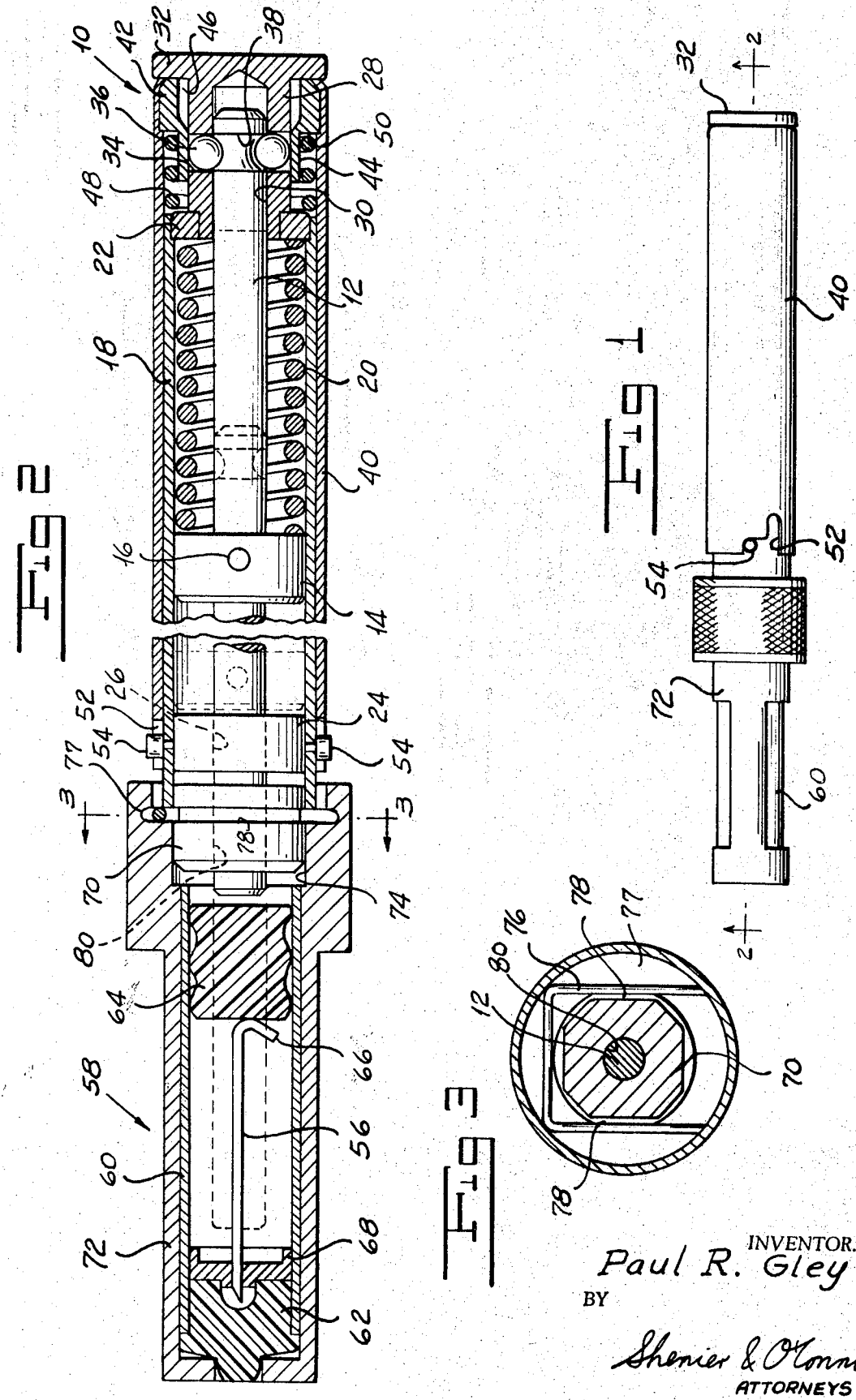

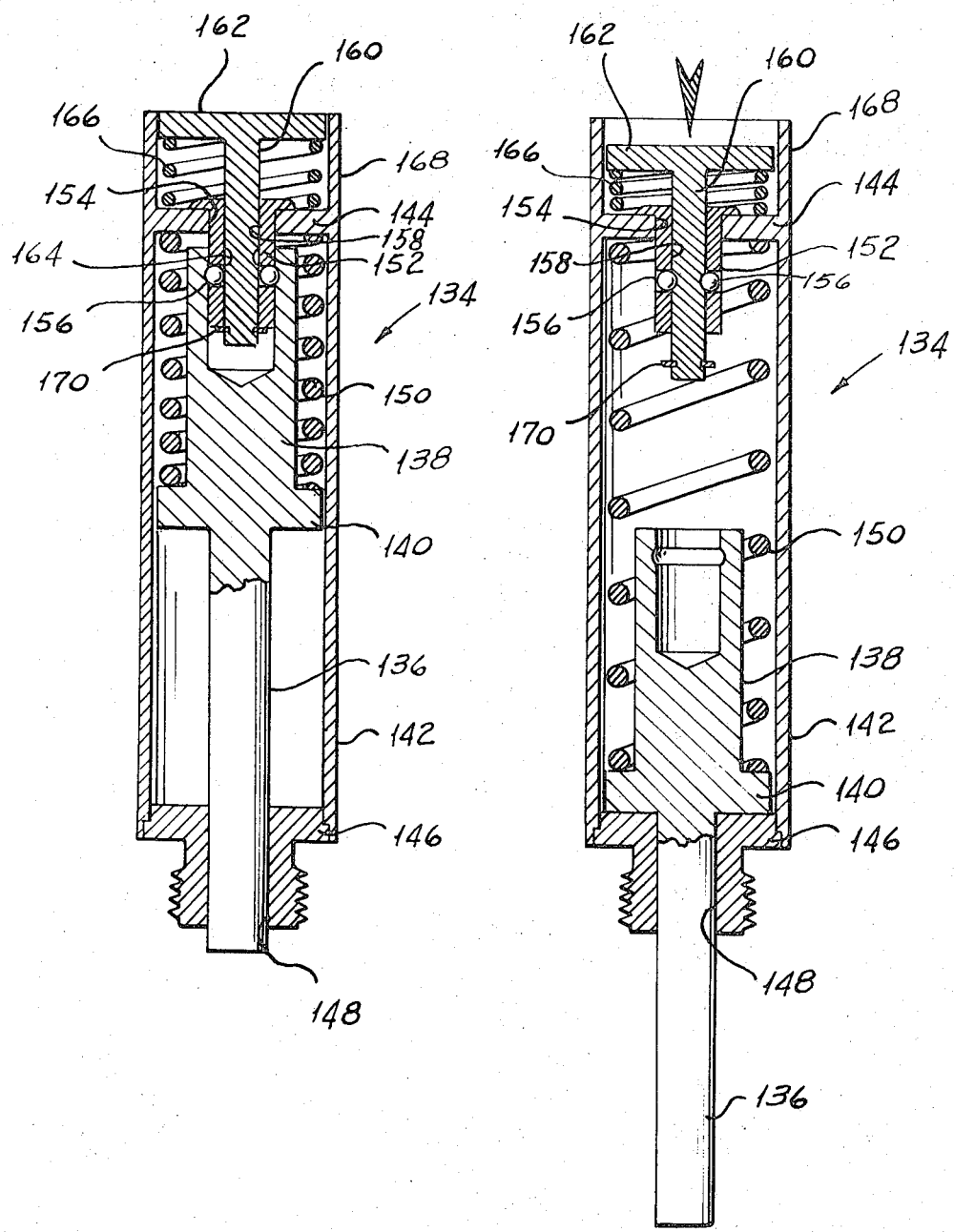

United States Patent Office 3,543,603
Patented Dec. 1, 1970

3,543,603
AUTOMATIC QUICK RELEASE MECHANISM
Paul R. Gley, Hillsdale, N.J., assignor to Rex Chainbelt Inc., Milwaukee, Wis., a corporation of Wisconsin
Filed Jan. 10, 1968, Ser. No. 696,793
Int. Cl. G05g 5/06
U.S. Cl. 74—527                                             4 Claims

ABSTRACT OF THE DISCLOSURE

An automatic quick release mechanism in which detent balls supported by a barrel may move between a first position at which they engage the groove in a plunger heavily spring-loaded for movement out of the barrel to lock the barrel in a retracted position and a second or release position out of engagement with the groove. A light spring biases an element mounted for telescoping movement with relation to the barrel to a position out of telescoping relationship with the barrel to urge a portion of the element into engagement with the balls to urge them to plunger-locking position. Movement of the element in the same direction as that in which the plunger is urged to move permits the balls to move out of locking position to release the plunger.

BACKGROUND OF THE INVENTION

There are known in the prior art spring-loaded plunger assemblies which are releasably held by various means in a retracted position against the operation of a spring. Such spring-loaded plunger assemblies of the type known in the prior art embody a number of defects.

Generally, the force which is exerted by the locking mechanism to hold it in the retracted position is necessarily relatively high and thus a relatively large force must be exerted to release the locking mechanism. Secondly, releasable locking mechanisms of the prior art require a relative movement of parts in a direction which is different from the direction of movement of the plunger upon release. They are consequently relatively inconvenient to use. Others of the spring-loaded mechanisms of the prior art afford only a low velocity movement of the plunger, owing to the fact that to require an excessive releasing force is impractical and the force required to release them is of the same order of magnitude as the loading force. Many of the release mechanisms of the prior art provide only a small throw of the plunger upon release.

I have invented an automatic quick release mechanism for a spring-loaded plunger which overcomes the defects of assemblies of the prior art. I have provided readily releasable means for securing a highly spring-loaded plunger in a retracted or loaded condition. My quick release mechanism imposes only a relatively light load on the release mechanism and in a direction opposite to the spring load. My mechanism is responsive to a small movement in the same direction as that in which the plunger is biased to move. My quick release mechanism is relatively simple in its construction and operation. It may easily be reset.

SUMMARY OF THE INVENTION

One object of my invention is to provide an automatic quick release mechanism which overcomes the defects of quick release mechanisms of the prior art.

Another object of my invention is to provide an automatic quick release mechanism for securing a highly spring-loaded piston or plunger in retracted or loaded condition.

Another object of my invention is to provide an automatic quick release mechanism in which the load imposed on the release mechanism is relatively small as contrasted to that which is imposed on the loaded piston or plunger.

A further object of my invention is to provide an automatic quick release mechanism in which the load imposed on the release mechanism is in a direction opposite to that which is imposed on the plunger or the like with which my mechanism is used.

Still another object of my invention is to provide an automatic quick release mechanism in which the movement required to release a plunger or the like is in the same direction as that in which the plunger moves upon release thereof.

A still further object of my invention is to provide an automatic quick release mechanism which is simple in its construction and in its operation.

Other and further objects of my invention will appear from the following description.

In general my invention contemplates the provision of an automatic quick release mechanism for a heavily spring-loaded piston or plunger in which detent balls supported in the wall of a barrel carrying the plunger may move into a groove in the plunger to hold it in retracted position. A relatively light spring urges an element carried by the barrel away from the barrel to cause a portion thereof to hold the balls in plunger-locking position. In response to movement of that element in the same direction as that in which the plunger is urged, the balls are freed and the plunger is released.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a side elevation of one form of my automatic quick release mechanism illustrating one application thereof.

FIG. 2 is a sectional view of the form of my automatic quick release mechanism illustrated in FIG. 1 taken along the line 2—2 of FIG. 1 and drawn on an enlarged scale.

FIG. 3 is a sectional view of the mechanism taken along the line 3—3 of FIG. 2.

FIG. 4 is a sectional view of an alternate form of my quick release mechanism showing the relative positions of parts in the retracted position of the plunger.

FIG. 5 is a sectional view of the form of my automatic quick release mechanism shown in FIG. 4 and illustrating the positions of the parts with the plunger released.

FIG. 6 is a fragmentary sectional view illustrating a modification of the form of my automatic quick release mechanism shown in FIGS. 4 and 5.

FIG. 7 is a sectional view of a further form of my automatic quick release mechanism illustrating the relative positions of the parts in plunger-locking position.

FIG. 8 is a sectional view of the form of my quick release locking mechanism shown in FIG. 7 with the plunger released.

DESCRIPTION OF THE PREFERRED EMBODIMENTS

Referring now to FIGS. 1 to 3 of the drawings, the preferred embodiment of my automatic quick release locking mechanism indicated generally by the reference character 10 may be employed for use with a plunger 12 having a collar 14 secured thereto by any suitable means such as a pin 16. A barrel 18 supports the collar 14 for sliding movement of the plunger relative to the barrel. A spring 20 bears between an annular plate 22 fixed to one end of the barrel 18 and the collar 14 normally to urge the plunger 12 to the left as viewed in FIG. 1. A stop 24 secured in the barrel 18 adjacent its end remote from plate 22 prevents collar 14 from being propelled out of the barrel. A bore 26 in the stop 24 guides plunger 12.

My automatic quick release mechanism for releasably holding plunger 12 in a retracted position in barrel 18 includes an end cap 28 secured in plate 22 by any suitable means and having a bore 30 into which an end of the plunger 12 can travel. I provide cap 28 with an annular flange 32 which, as will be described hereinafter, acts as a stop and which may conveniently serve as a thumbpiece in use of my mechanism.

I form the cap 28 with a plurality of bores or openings 34 leading into the bore 30. Each of the openings 34 receives a detent ball 36, movement of which inwardly of the bore is limited by a lip to prevent the balls from falling into the cap bore 30. I provide the right end of plunger 12, as viewed in FIG. 2, with an annular groove 38 into which portions of the balls 36 are adapted to ride to hold the piston 12 in a retracted position with respect to the barrel 18, in a manner to be described.

In the preferred form of my invention shown in FIGS. 1 to 3, barrel 18 carries for movement with respect thereto an outer sleeve 40. I mount a ball-locking element 42 within the righthand end of sleeve 40 as viewed in FIG. 2. Element 42 includes a portion 44 adapted to move in closely spaced relationship to the outer surface of end cap 28. I form element 42 with an enlarged bore portion 46 which forms a space between the outer surface of cap 28 and a portion of the inner surface of element 42.

It will be apparent that with the locking portion 44 of element 42 over the holes 34, balls 36 are forced inwardly to positions at which portions thereof extend into bore 30. As will be apparent from the description given hereinbelow, this is the locking position of the balls. Alternatively, when the enlarged bore 46 of element 42 is over the holes 34, the balls are freed to move outwardly. I dispose a coil spring 48 within sleeve 40 so as to bear between plate 22 and a shoulder 50 on element 52 normally to urge the element and sleeve 40 to the right as viewed in FIG. 2.

With the structure thus far described, the plunger 12 can be releasably locked in a retracted position and subsequently released in response to a relatively small movement produced by a light force. Assuming that the plunger is in its released position, indicated in broken lines in FIG. 2, to cock the plunger 12 the exposed end thereof is moved against a resistant surface and sleeve 40 is pushed inwardly toward the surface. In response to this operation, first the relatively light spring 48 is compressed and, upon continued movement, the spring 20 is compressed. As spring 48 is compressed element 48 moves to a position at which its enlarged bore portion 46 is over the balls 36 so that the latter are free to move out of the bores 34. As spring 20 is compressed, ultimately groove 38 rides to a position adjacent the balls. Now, with the plunger 12 still firmly held in engagement with the surface by means of end cap 28, sleeve 40 is released and spring 48 moves element 42 to a position at which portion 44 urges the balls inwardly to cause the balls to enter recess 38. The plunger now is locked and upon release of the end cap 28, it will be held in its locked position.

I provide respective step slots 52 at the ends of sleeve 40 remote from the cap 28. Pins 54 on the barrel are adapted to cooperate with the step slots 52 to provide a positive lock against accidental release of the mechanism. In order to perform the plunger locking operation described above, pins 54 are aligned with the deeper portions of slots 52. After the locking operation has been accomplished, the sleeve 40 is rotated slightly to position the slot steps adjacent the pins to hold the assembly positively locked against accidental release.

To release the plunger from the locked position just described, sleeve 40 first is rotated from the position just described to a position at which pins 54 are aligned with the deeper parts of the slots. With the parts in that position, sleeve 40 is moved in a direction to compress spring 48. This may be achieved, for example, by moving the entire assembly into engagement with a resistant surface against which plunger 12 is to exert its force. As soon as the enlarged bore portion 46 of element 42 moves over balls 36, spring 20 moves plunger 12 to the left to cam balls 36 outwardly and to drive the plunger at a high velocity through a relatively large displacement to the broken line position. It will be apparent that only a relatively light force is exerted by my mechanism on the releasing element 42. Moreover, the movement of the releasing element to free the plunger is in the same direction as that in which the plunger moves upon release thereof.

In FIGS. 1 to 3 I have shown an example of a particular application of my automatic quick release mechanism. In the example shown, it is used to drive a needle 56 of a cartridge assembly, indicated generally by the reference character 58, adapted to inject a serum or the like into a patient. Cartridge 58 includes a wall 60, one end of which is closed by a cap 62 adapted to be pierced by needle 56. The other end of the cartridge 58 is closed by a fluid-tight sealing element 64 adapted to be driven to force the needle 56 through plug 62 and into a patient. The piston 64 also forces fluid into the needle through an end 66 thereof adjacent the bent needle portion on which the piston bears. The assembly 58 may also incorporate a needle guide 68. In use of the plunger 12 with which the form of my quick release mechanism shown in FIGS. 1 to 3 is employed, I mount an adapter 70 on the open end of barrel 18 by any suitable means such, for example, as by screw threads or the like. A cartridge holder 72 adapted to receive the cartridge 58 has an enlarged bore portion 74 for receiving the end of adapter 70. A U-shaped clip 76 engages in an annular recess 77 in the holder 72 and in grooves 78 in adapter 70 to hold the carrier 72 on the adapter 70. A bore 80 in the adapter 70 receives the plunger 12.

Referring now to FIGS. 4 and 5 of the drawings, in an alternate form of my automatic quick release mechanism, indicated generally by the reference character 82, a plunger 84 has an enlarged portion 86 and an annular boss 88 which guides the plunger for movement in a barrel 90, the upper end of which is provided with a wall 92 and the lower end of which receives a stop 94 having a plunger guide bore 96 therein. The stop 94 may be threaded as at 98 to receive any mechanism adapted to be acted on by the plunger 84. A spring 100 bears between the wall 92 and the boss 88 normally to urge the plunger 84 outwardly of the barrel 90.

I thread or otherwise secure a ball carrier 102 in an opening 104 in wall 92. I form the wall of the ball carrier 102 with openings 106 for receiving detent balls 108. As in the form of my invention shown in FIGS. 1 to 3, I provide the inner edges of openings 106 with lips for preventing the balls from moving into the bore 110 of the carrier 104. A stud 112 having an annular detent ball-receiving recess 14 is adapted to be screwed into a bore 116 in the upper end of the plunger enlargement 86. The barrel 90 carries a sleeve 118, the upper end of which has a wall 120 formed with a ball actuating or locking portion 122 disposed below a recess 124. A spring 126 bears between the wall 92 and the wall 120 normally to urge sleeve 118 upwardly to a limit position at which the movement of the sleeve is arrested by the engagement of wall 120 with a stop ring 128 carried by the ball carrier 104. With the portion 122 of wall 120 adjacent the openings 106, balls 108 are locked in a position at which they will lock plunger 84 when it is in its retracted position. When the recess 124 is adjacent the openings 106, balls 108 are free to move outwardly to release the plunger 84. If desired, in this form of my invention I may provide the assembly with a protective cap 130 formed of plastic or the like and snapped onto the top of the sleeve 118.

As an alternative to the construction shown in FIGS. 4 and 5, I may, as shown in FIG. 6, do away with the cap 130 and replace the screwhead of stud 112 with a thumbpiece 132.

Referring to FIGS. 7 and 8, in a further form of my invention, indicated generally by the reference character 134, a plunger 136 has an enlarged upper portion 138 and an annular boss 140 which guides the plunger for movement in a barrel 142 having an upper end wall 144 and a stop 146 at the lower end thereof provided with a plunger guide bore 148. A spring 150 bears between wall 144 and boss 140 normally to urge the plunger 136 outwardly of the barrel 142.

I mount a generally cylindrical ball housing 152 in an opening 154 in the wall 144. This housing has openings carrying detent balls 156 in the same manner as does the housing 102 of the form of my invention shown in FIGS. 4 and 5. The ball housing 152 has a longitudinally extending bore 158 which slidably receives a stem 160 of a push button 162. Stem 160 has an annular recess 164 for the reception of the balls 156 in the unlocked position of the parts. A light spring 166 urges a push button 162 upwardly along a guide portion 168 of barrel 142 above wall 144 to a limit position in which a stop 170 on stem 160 engages the lower end of housing 152.

In operation of the form of my automatic quick release mechanism shown in FIGS. 1 and 2, in order to cock the mechanism sleeve 40 first is turned relative to the barrel 18 to a position at which the pins 54 are aligned with the deeper parts of the step slots 52. Then grasping the sleeve 40 the end of the plunger 14 is moved against a resistant surface. In response to this operation, spring 48 first is compressed to move the portion 44 out of alignment with the ball 36 so that the balls are free to move into the space 46. Upon continued pressure on the sleeve 40, spring 20 is compressed until, finally, the groove 38 is adjacent the balls 36. Now, the head 32 is held and the sleeve 40 is released to permit spring 48 to move the sleeve to a position at which its end abuts head 32. In that position of the parts, boss 44 holds the balls in engagement with the groove 38 to lock the plunger 12. If it is desired to lock the releasing mechanism against accidental release, sleeve 40 is rotated until the pins 54 are aligned with the steps of slots 52.

In one application of the form of my invention shown in FIGS. 1 to 3, it is associated with a cartridge 60 which is adapted to be actuated to inject a fluid into the arm of a patient or the like. To perform this operation the end of the cartridge holder 58 is moved against the patient's arm and sleeve 40 is pushed with a relatively light pressure to compress spring 48 until recess 46 is aligned with balls 36. In that position of the parts spring 20 drives the plunger out of the barrel 18 with a relatively high velocity to cause the end of the plunger to actuate plug 64 to cause the needle 56 to be driven into the patient's arm and to cause fluid to be displaced through the needle and into the patient's arm. It will be appreciated that before recocking of the plunger, the cartridge holder 58 is removed from the adapter 70.

The operation of the other forms of my invention shown in FIGS. 4 to 8 is substantially the same as that discussed above in connection with the forms of the invention shown in FIGS. 1 to 3. One difference in operation of the forms of the invention shown in FIGS. 7 and 8 is that the plunger is released in response to actuation of a thumb button 162 rather than in response to pressure exerted on a sleeve.

It will be seen that I have accomplished the objects of my invention. I have provided an automatic quick release mechanism which overcomes the defects of quick release mechanisms of the prior art. I secure a relatively heavily spring-loaded plunger in retracted position while requiring only a relatively small force to release the plunger. The direction of movement of the releasing mechanism is the same as the direction of movement of the plunger upon release. The load imposed on the release mechanism is in a direction opposite to that which is imposed on the plunger with which my mechanism is used.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An automatic quick release mechanism including in combination, a housing, a plunger mounted in said housing for movement in a certain direction from a cocked position to an extended position, a first spring in said housing for biasing said plunger for movement from said cocked position to said extending position, said plunger having a recess therein, a detent ball mounted on said housing for movement between a first position out of engagement with said recess in which said spring is free to act and a second position in engagement with said recess to lock said plunger in its cocked position with said spring loaded, an externally accessible manually operable actuator mounted on said housing for movement in said direction from a locking position in engagement with said ball to hold said ball in its second position to a release position at which said ball is free to move to its first position and a second spring biased directly between said actuator and said housing for urging said actuator to its locking position.

2. An automatic quick release mechanism as in claim 1 in which said plunger has a shank with said recess provided therein, said mechanism including a generally cylindrical ball support having a centrol bore for receiving said shank and a wall opening carrying said ball, said actuator comprising a sleeve formed with a boss and mounted on said barrel for limited movement between a position at which said boss is adjacent said opening and a position at which said boss is remote said opening.

3. An automatic quick release mechanism as in claim 1 in which said plunger has a shank with said recess provided therein, said mechanism including a generally cylindrical ball support having a central bore for receiving said shank and a wall opening carrying said ball, said actuator comprising a sleeve formed with a boss and mounted on said barrel for limited movement between a position at which said boss is adjacent said opening and a position at which said boss is remote said opening, an extension on said shank and a thumbpiece on said extension.

4. An automatic quick release mechanism as in claim 1 in which said plunger comprises a generally cylindrical opening having a recess in the wall thereof, said mechanism including a generally cylindrical ball support having a central bore and a wall opening carrying said ball, said plunger opening adapted to telescope over said ball support to permit its recess to receive said ball, said actuator comprising a stem disposed in said support bore, said stem being formed with a recess.

References Cited
UNITED STATES PATENTS

| | | | |
|---|---|---|---|
| 2,581,537 | 1/1952 | Maisch | 85—5 XR |
| 2,816,471 | 12/1957 | Bachman | 85—5 |
| 3,052,940 | 9/1962 | Sellers | 85—5 XR |
| 3,385,559 | 5/1968 | Churchill | 74—527 XR |
| 2,455,270 | 11/1948 | Ravella | 74—2 XR |
| 3,233,496 | 2/1966 | De Pew et al. | 85—5 |
| 3,182,660 | 5/1965 | Weydanz et al. | 128—218.2 |

FOREIGN PATENTS

| | | |
|---|---|---|
| 897,080 | 5/1944 | France. |

FRED C. MATTERN, Jr., Primary Examiner

F. D. SHOEMAKER, Assistant Examiner

U.S. Cl. X.R.

74—2, 529; 128—218